July 11, 1944.  R. SPURR  2,353,519
MECHANISM FOR CHARGING CONTAINERS
Filed Feb. 15, 1941  8 Sheets-Sheet 1
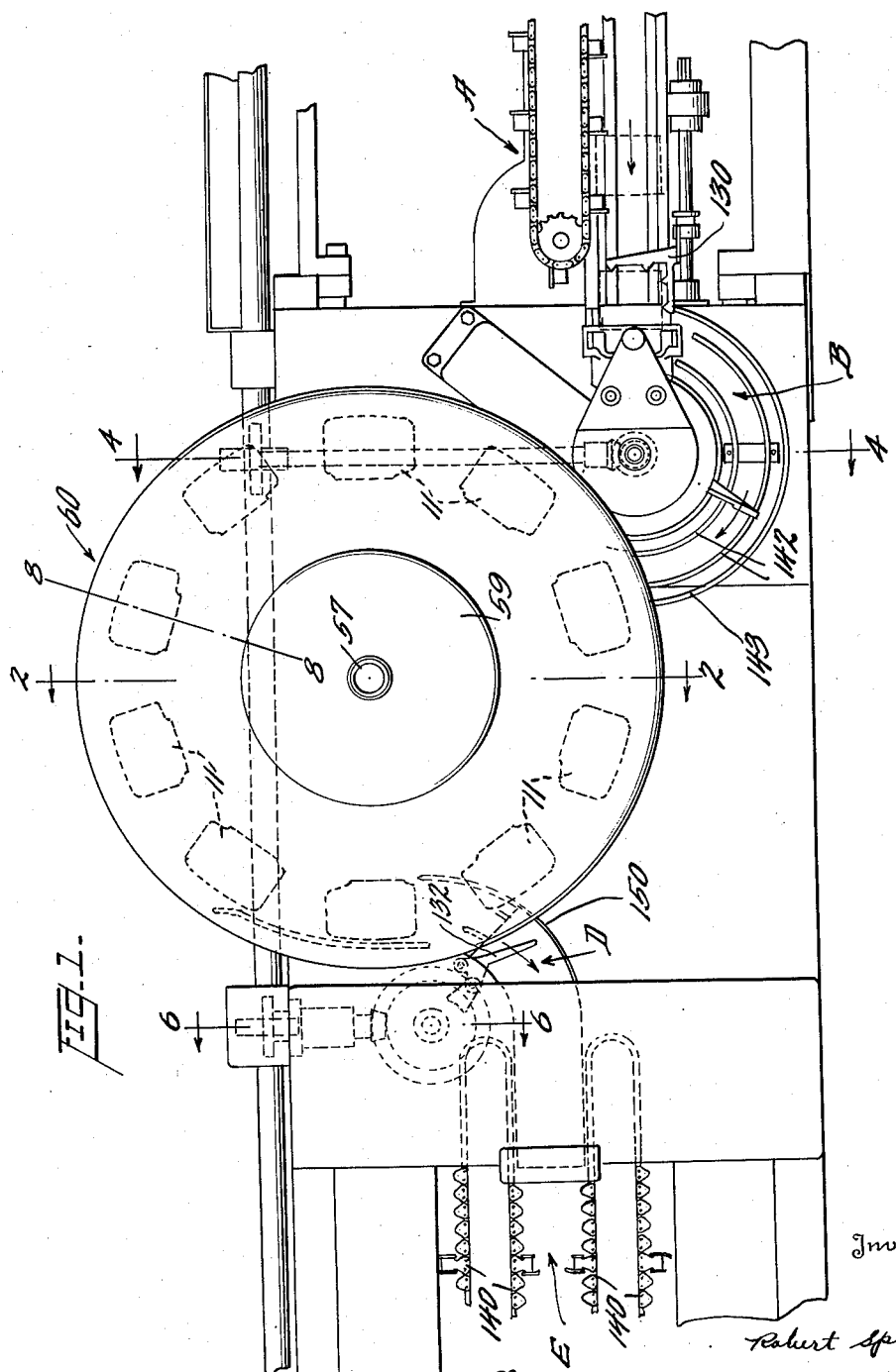

July 11, 1944.  R. SPURR  2,353,519
MECHANISM FOR CHARGING CONTAINERS
Filed Feb. 15, 1941   8 Sheets-Sheet 2
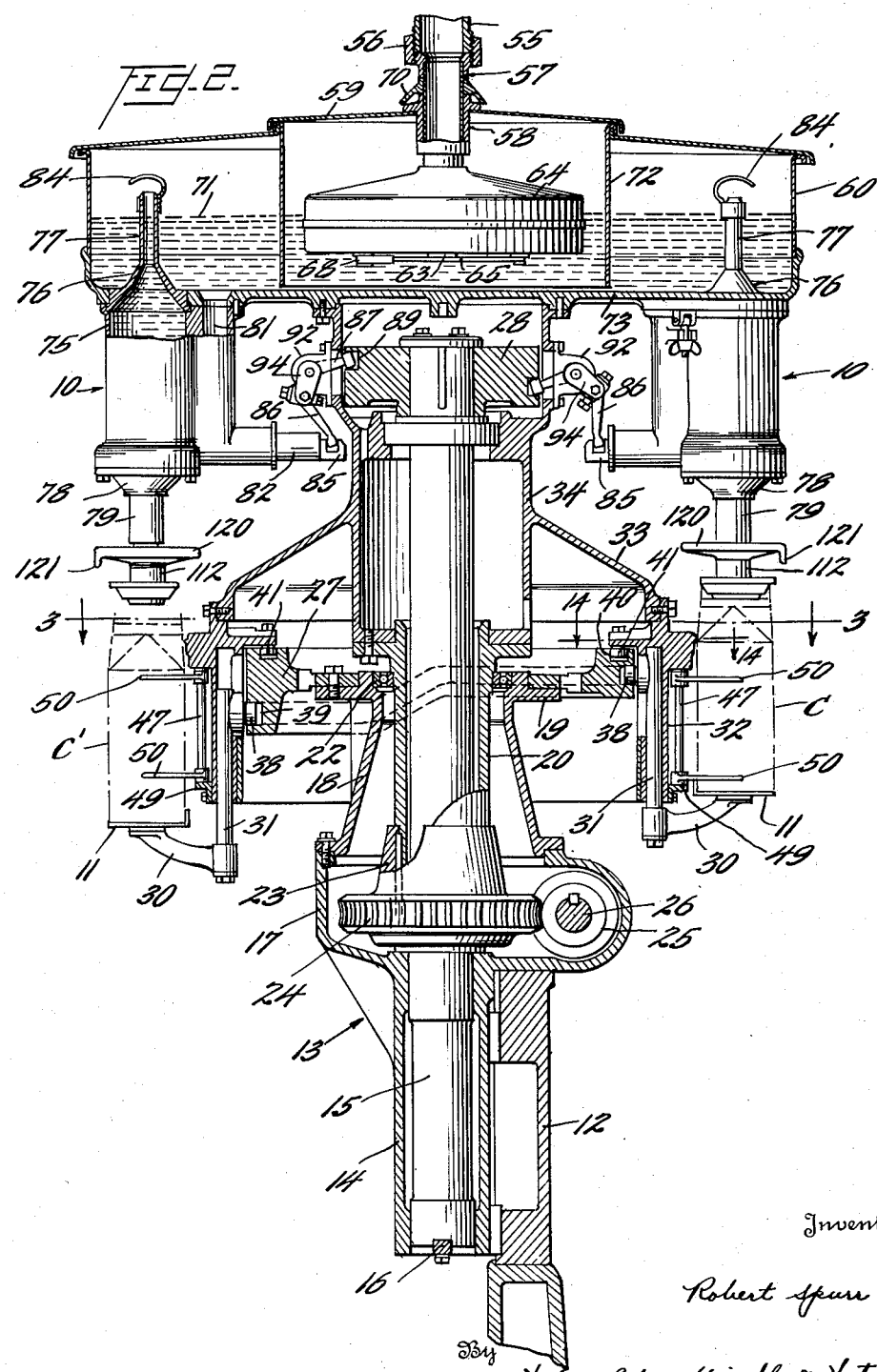
Inventor
Robert Spurr
By Watson, Cole, Grindle & Watson
Attorney

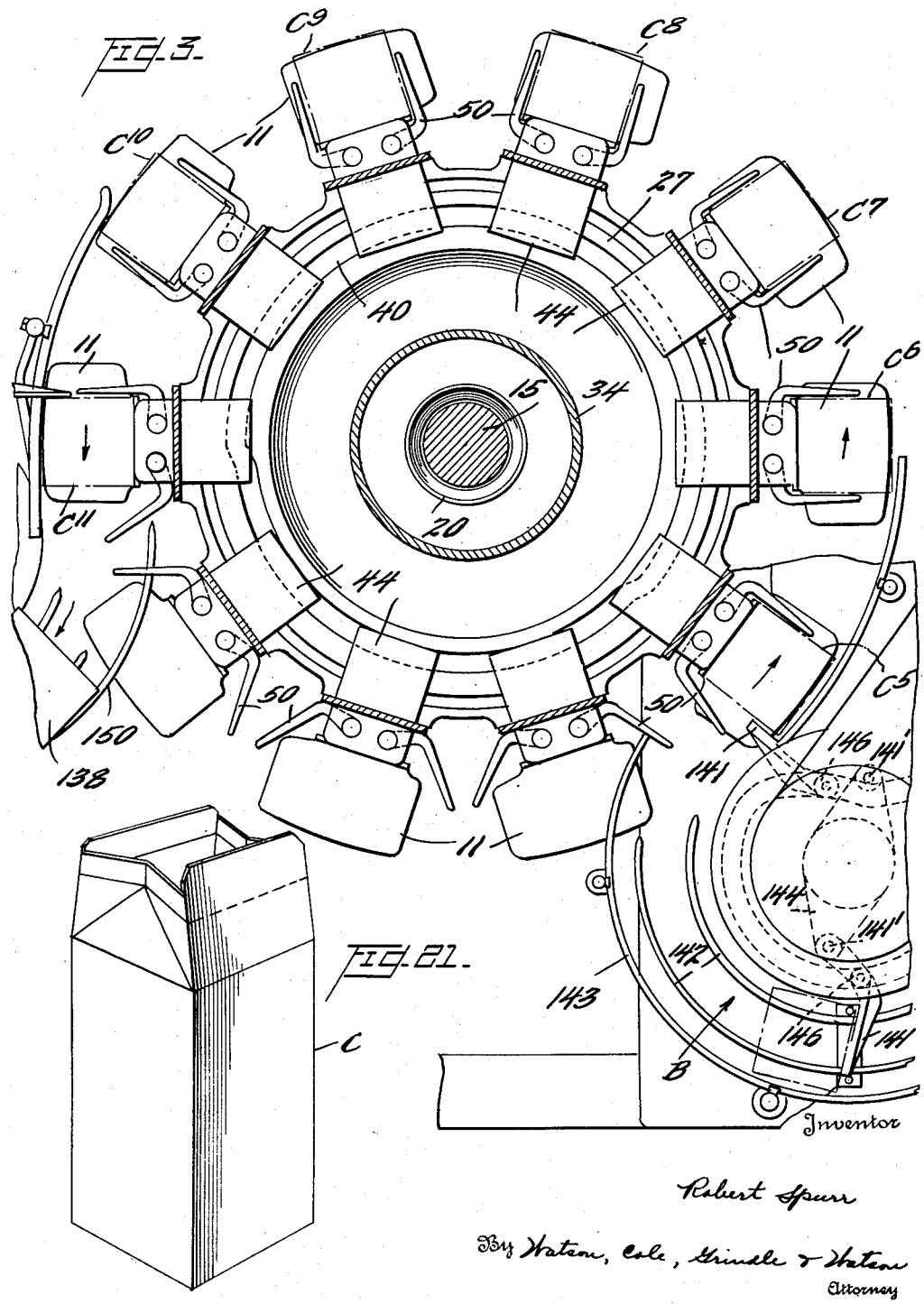

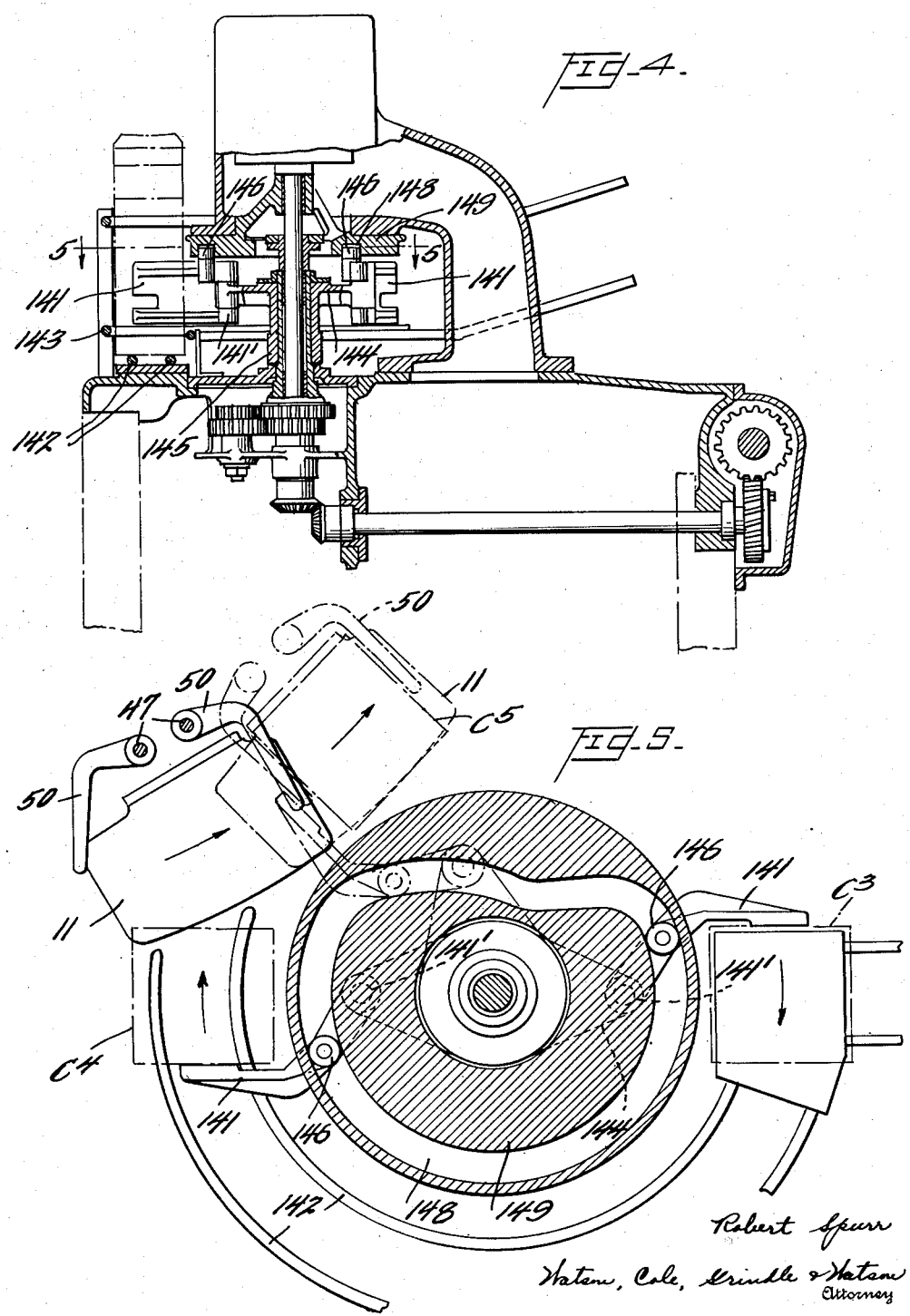

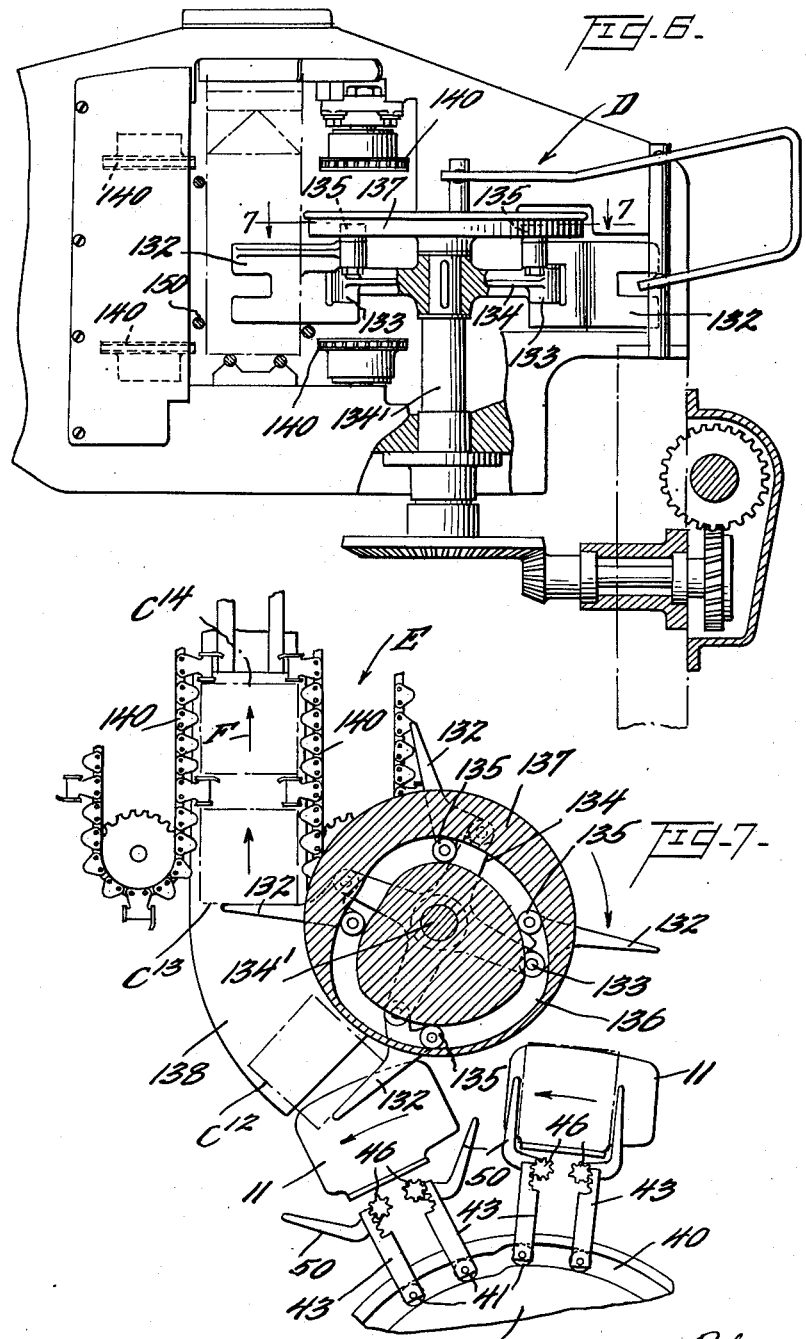

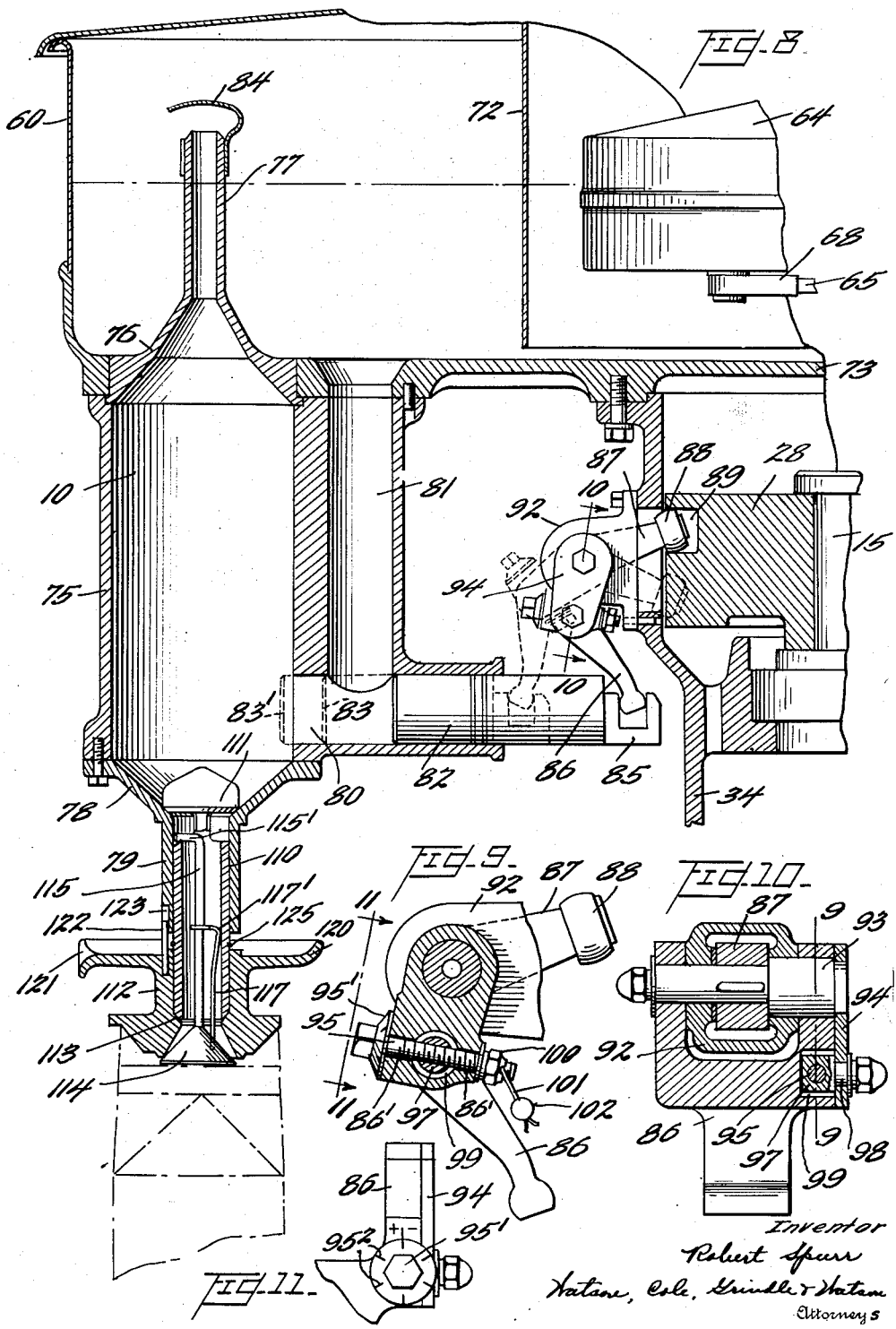

July 11, 1944.                    R. SPURR                    2,353,519
                      MECHANISM FOR CHARGING CONTAINERS
                    Filed Feb. 15, 1941           8 Sheets-Sheet 7
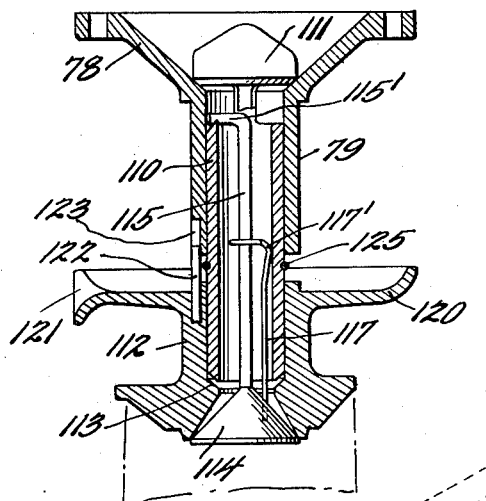
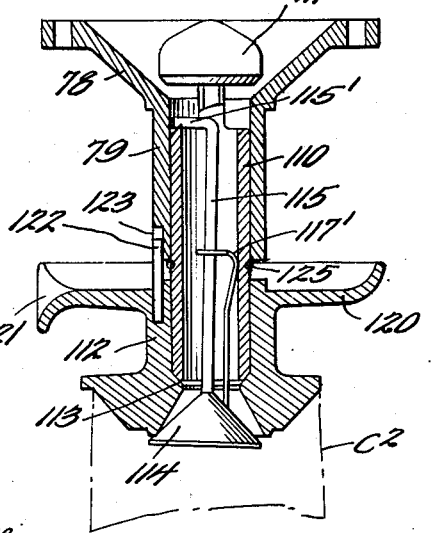
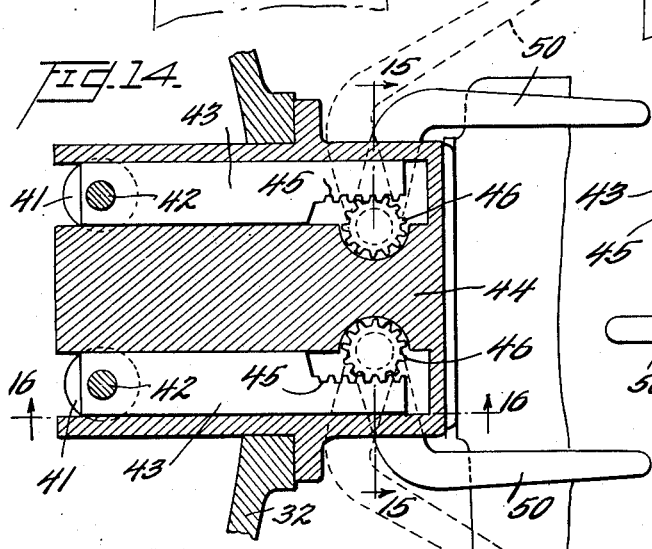
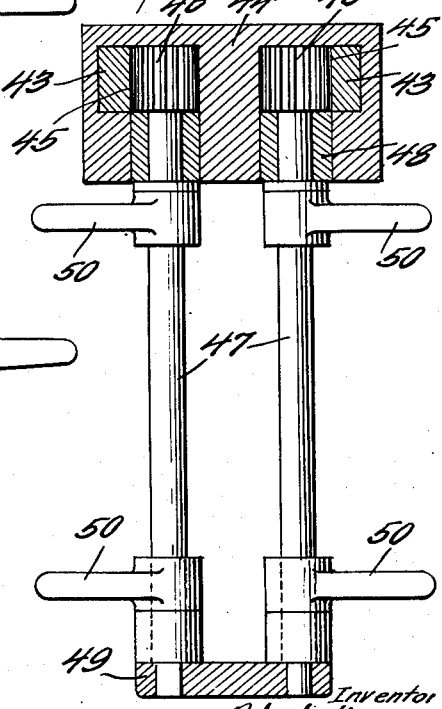
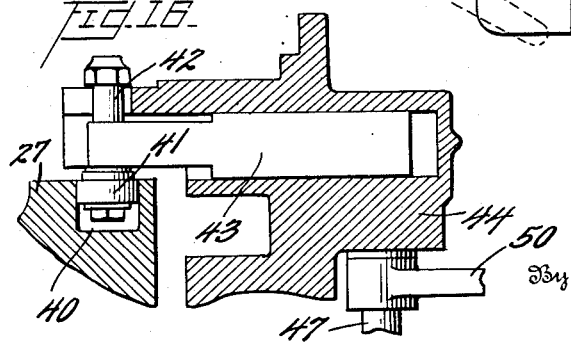

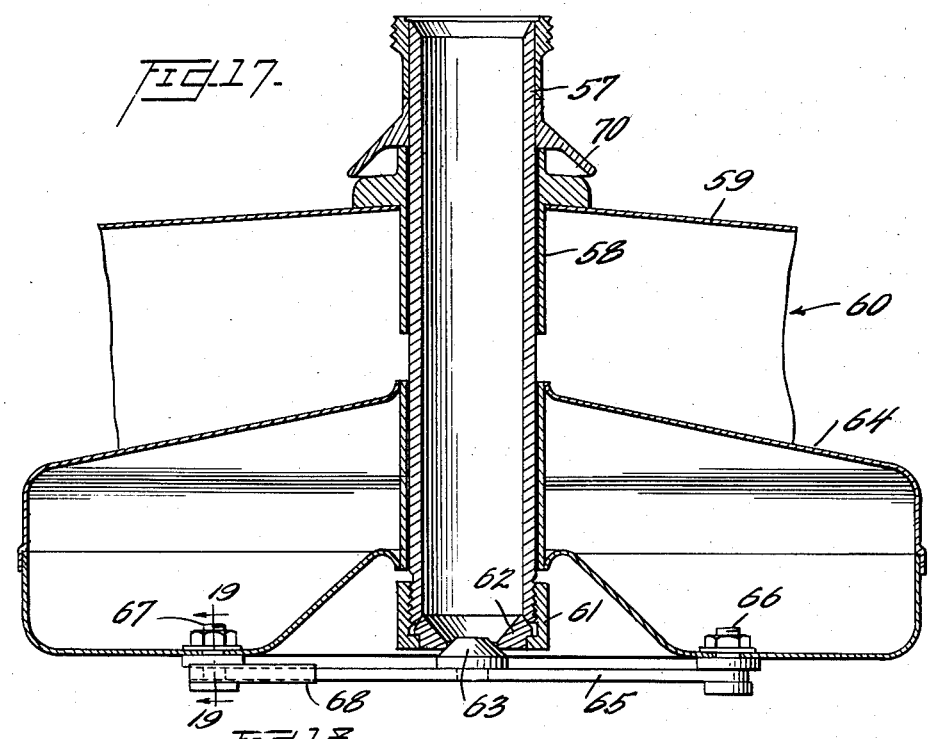
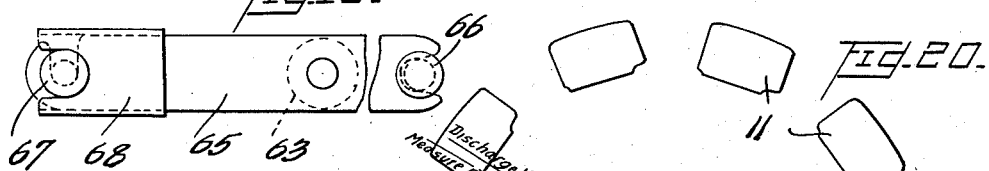
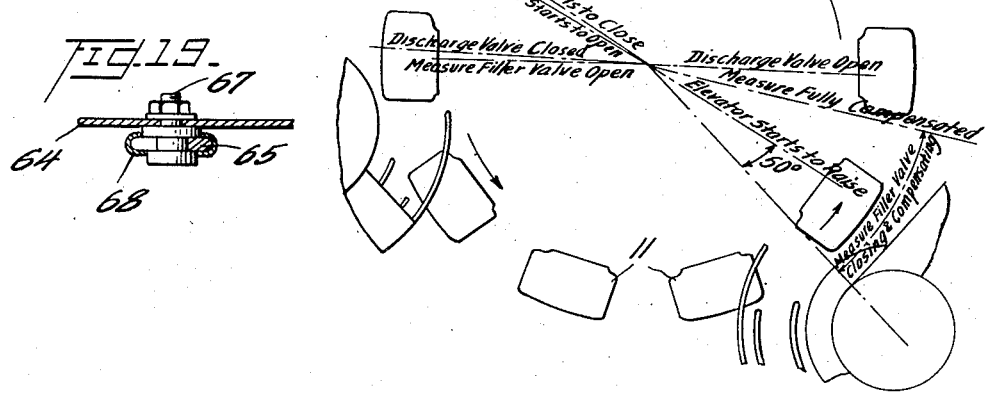

Patented July 11, 1944

2,353,519

UNITED STATES PATENT OFFICE 2,353,519

MECHANISM FOR CHARGING CONTAINERS

Robert Spurr, Detroit, Mich., assignor to The American Paper Bottle Company, Toledo, Ohio, a corporation of Ohio Application February 15, 1941, Serial No. 379,136

19 Claims. (Cl. 226—96)

The present invention relates to mechanisms for charging containers and particularly to container charging mechanisms of the fully automatic type designed and constructed to charge with a precisely measured volume of liquid each successive container presented to it by conveying mechanism.

The charging mechanism which comprises the subject matter of the invention is of the continuous type, the containers being filled as they are moved along a predetermined path, a continuously operated transfer device presenting empty containers to the filling mechanism and a second continuously operating transfer device removing filled containers therefrom. The mechanism as an entirety is well suited for use in association with other essential mechanisms of a complete automatic machine for the fabrication, coating, charging, closing and sealing of paper containers intended for use in the packaging of liquids such as milk but may be employed as an independent unit whenever desired. It embodies a number of features of novelty which render it most efficient in the performance of its intended functions, being particularly well suited to rapidly deliver accurately measured volumes of liquid such as milk, without causing objectionable foaming of the milk. The entire mechanism is of great simplicity, involving the use of a minimum number of operating parts, and the various elements thereof are so assembled together that they may be readily disassembled for the purpose of cleaning and sterilization. A preferred form of the invention is illustrated in the accompanying drawings and will be described in detail. It will be appreciated, however, that, without departure from its teachings, minor changes may be made in the design and arrangement of its component elements.

In the drawings:

Figure 1 is a top plan view of the container charging mechanism with associated means for presenting empty containers to it and withdrawing such containers therefrom;

Figure 2 is a section on line 2—2 of Figure 1;
Figure 3 is a section on line 3—3 of Figure 2;
Figure 4 is a section on line 4—4 of Figure 1;
Figure 5 is a section on line 5—5 of Figure 4;
Figure 6 is a section one line 6—6 of Figure 1;
Figure 7 is a section on line 7—7 of Figure 6;
Figure 8 is a section on line 8—8 of Figure 1, on a somewhat larger scale;
Figure 9 is a view of certain operating elements of the liquid measuring means, partially in elevation and partially in section;

Figure 10 is a section on line 10—10 of Figure 8;
Figure 11 is a side elevation of portion of this mechanism, as seen from the line 11—11 of Figure 9;
Figure 12 is an axial section through the liquid discharge duct of one of the liquid measuring mechanisms, the valves forming part of this assembly being closed;
Figure 13 is a similar view showing the valves in open position;
Figure 14 is a section on line 14—14 of Figure 2;
Figure 15 is a section on line 15—15 of Figure 14;
Figure 16 is a section on line 16—16 of Figure 14;
Figure 17 is an enlarged axial section through a float and associated valve which comprises portion of the mechanism, showing also, in section, other closely associated elements;
Figure 18 is a plan view, partially broken away, of a valve supporting member of the float control valve assembly;
Figure 19 is a section on line 19—19 of Figure 17;
Figure 20 is a diagram to indicate the sequence of movement of the various valves and other operating parts of the mechanism; and
Figure 21 is a perspective view of a container for the filling of which the charging mechanism has been particularly designed.

The container which is illustrated in perspective in Figure 21 is fabricated of paper and has proven to be eminently suited for the packaging of liquid, particularly milk. In this figure the container is shown in a partially completed form, its upper end closure having been only partially folded so that an ample aperture still remains through which the charge of liquid may be inserted. After having been charged, the foldable top will be further acted upon and completely closed, the charged and sealed container ready for use being substantially as disclosed in Patent No. 2,047,891, issued to Henry T. Scott July 14, 1936.

While the charging mechanism now to be described in detail has been primarily designed for the charging of containers such as that shown in Figure 21, which are rectangular in cross-section, it may nevertheless be readily modified so as to be suitable for the charging of containers of slightly different shape and design.

The mechanism is of the type which includes a plurality of measuring cylinders, such as indicated at 10 in the drawings, arranged in a circular series and mounted for revolution about a fixed vertical axis, together with a circular series of container supporting platforms such as indicated at 11, one such platform being directly beneath each of the measuring cylinders 10 and the circular series of platforms being movable with the measuring cylinders about such fixed vertical axis, means being provided for automatically raising the containers into charge receiving position while the measuring cylinders and platforms revolve and lowering the containers successively after they are fully charged, that container indicated at C in Figure 2 being shown in charge receiving position and the container indicated at C' in this figure being shown in the position which it occupies before and after receiving its charge, the container indicated at C' being shown in order that its position may be readily compared with that of a container in charging position C and although no container would ordinarily appear here in a section such as section 2—2. The discharge controlling valve means associated with each measuring cylinder is actuated by a lifting force applied by a container moved upwardly against it and the discharge port is again closed when the container is lowered. All parts of the mechanism are so designed and correlated that the charging operations proceed rapidly, accurately, and without causing foaming.

In Figure 2 of the drawings portion of a supporting base is indicated at 12 and resting upon and firmly secured to this base is a frame member generally indicated at 13. The lower portion 14 of frame 13 comprises a fixed bearing support for the lower end of a vertically disposed solid shaft 15, the lower end of this shaft being recessed to receive a key 16 the ends of which are retained within notches formed in bearing 14, the shaft 15 being thus locked against rotation in its support. Above the cylindrical shaft receiving portion of the frame 13 is an enlarged portion 17 and above this a frusto-conical portion 18 terminating in a peripheral horizontal flange 19. A hollow shaft 20 coaxial with the solid stationary shaft 15 is rotatably supported by frame 13, shaft 20 being rotatably supported adjacent its upper end by an annular bearing 22 of the ball or roller type seated within an annular groove formed interiorly within the upper end of the frusto-conical portion 18 of the frame and rotatably supported at its lower end by means of a suitable bearing (not shown), such as a conical or tapered roller bearing. Keyed upon the lower end of the hollow shaft 20, and disposed within the enlarged portion 17 of the frame, is a sleeve 23 upon which is fixed the worm wheel 24 the teeth of which mesh with those of a worm 25 fixed upon a drive shaft 26. It will thus be seen that, when the drive shaft 26 is revolved, the hollow shaft 20 will be revolved about the common axis of this shaft and shaft 15. Certain of the operating mechanisms are carried by the stationary frame 13 and the stationary shaft 15 and other and cooperating parts of the mechanism are carried by and revolved with the rotating hollow shaft 20.

Thus there is fixed upon the flange 19 at the top of the frusto-conical frame part 18 a cam 27 which may be designated a lower cam and fixed upon the stationary shaft 15 at its upper end a second cam 28 which may be designated an upper cam. Certain parts of the mechanism are actuated as they revolve about the stationary lower cam 27, being operatively connected to this cam, these parts effecting the rising and falling movements of the platforms and insuring the lateral stability of the containers mounted thereon, and certain parts revolving about the upper cam 28 and operatively engaging said cam effecting the automatic measuring of liquid charges for the containers below.

It will be observed that each container supporting platform 11 is mounted upon the outer end of a bracket 30 disposed radially of the machine, the inner end of this bracket being provided with a socket which receives the lower end of a vertically disposed elevating rod 31 slidably supported in a slideway formed in a cylindrical skirt-like member 32 revoluble with the rotatable hollow shaft 20, the upper end of cylindrical member 32 being rigidly attached to the cylindrical lower edge of an upwardly and inwardly tapering web 33 the upper edge of which merges with hollow cylindrical member 34 mounted upon the upper end of shaft 20 and in reality forming part of this shaft. At or toward its upper end each vertically disposed sliding rod 31 is provided with a cam follower 38 which is disposed within a continuous cam track 39 formed in the cylindrical surface of the lower cam 27. Various portions of the cam track 39 are at different elevations and it follows that, as the shaft 20 rotates, causing the vertical slide rods 31 to revolve about the axis of the cam 27, these rods and the associated container supporting platforms will be given the desired vertical movements at the proper times.

Formed in the upper horizontal surface of the fixed lower cam 27 is a second continuous cam track, indicated at 40, the distance of which from the axis of shaft 20 varies, measured radially of the cam, and within this cam track are disposed a plurality of cam followers 41, arranged in pairs, one pair of cam followers being disposed closely adjacent each platform 11 and it is the radial movements of these cam followers as the shaft 20 revolves, by cooperation with the stationary cam 27, which results in the actuation of the displaceable means for laterally confining the container mounted on the adjacent platform during the major portion of its travel around the axis of the charging mechanism, and displacement of this container confining means to facilitate removal of a charged container from a platform at one point and placement upon such platform of an empty container at a succeeding point in the travel of the platform.

Thus a pair of cam followers 41 is illustrated clearly in Figure 14 and each of these is seen to be rotatably mounted upon a stud or arbor 42 depending from a slide 43, these slides being disposed substantially radially of the apparatus and mounted for limited longitudinal movement in suitable slideways formed in a guide block 44 supported in a notch formed in the upper edge of the cylindrical skirt 32. Each slide 43 is formed with a rack 45 at its outer end the teeth of which mesh with those of a pinion 46. As shown most clearly in Figure 15, the pinions 46 are fixed upon, respectively, the upper ends of parallel vertically disposed rods 47, which rods are revolubly mounted in upper bearings 48 fixed in block 44 and the lower ends of which are rotatably supported in cylindrical apertures formed in the bracket 49, fixed to the lower portion of the cylindrical member 32. Each such revoluble rod 47 supports two arms 50 and it is the function of the mechanism just described to move these arms from container embracing position, as indicated in full lines in Figure 14, to inoperative position, as indicated in dotted lines in the same figure, the arms, however, being operated individually and in sequence, instead of simultaneously, inasmuch as the cam followers 41 are influenced by the stationary cam in sequence as the shaft 20 revolves, rather than simultaneously. The importance of sequential operation in the functioning of the apparatus will be hereinafter explained.

A pipe or conduit for leading liquid to the container charging apparatus is indicated at 55, the discharge end of this pipe being coaxial with shafts 15 and 20. There is detachably secured to the lower end of this shaft, as by means of a coupling member 56, a short vertically disposed tubular extension 57 which projects downwardly from the coupling through a sleeve 58 located in an aperture formed in the removable top 59 of the liquid tank generally indicated at 60. At its lower end the tubular liquid conduit extension 57 is exteriorly threaded for the reception of an interiorly threaded valve seat retaining cap 61, by means of which the annular valve seat member 62 is detachably retained in the position in which it is shown in Figure 17. Closely cooperating with the valve seat member 62 is an upwardly tapered valve 63 detachably connected to float 64 which encircles the tubular extension 57 and is slidable vertically of said member for a limited distance in order that the valve 63 may open when the liquid level in tank 60 falls below a predetermined point and may close when the liquid level has been restored.

Valve 63 is mounted upon a valve supporting rod 65 the ends of which are formed as shown in Figure 18, one end being axially notched and the other end being laterally notched to receive the reduced shanks of the headed bolts 66 and 67, respectively, which bolts project through apertures formed in the bottom of float 64. A locking sleeve 68 slidably mounted upon rod 65 may be advanced to the position in which it is shown in Figures 17 and 18 to lock the bar 65 in operative position or this sleeve may be retracted to permit the bar to be removed, in order that the sleeve 61 may be rendered accessible and removable, together with the valve seating member 62, for the purpose of cleansing and sterilization. Just below the coupling 56 there is positioned a frustoconical member 70 the function of which is to laterally divert any condensate flowing downwardly along pipe 55 and prevent the entry of such condensate into the tank 60 through the annular space between the outer surface of tubular extension 57 and the inner surface of sleeve 58, such a gap being necessarily left at this point to prevent wear between these concentric parts, the tank 60, of course, revolving with the shaft 20 during the operation of the mechanism, and the pipe 55 with its extension 57 remaining stationary.

Liquid issuing from the lower end of tubular extension 57 when the valve 63 is unseated will be discharged centrally into the tank 60 and the liquid level in the tank will preferably be maintained in the immediate vicinity of that indicated at 71 in Figure 2. A cylindrical baffle 72 tends to prevent surging of the liquid in the tank as the tank revolves, the lower edge of this baffle being disposed just above the upper surface of the bottom 73 of the tank. The tank bottom rests upon the upper end of the member 34 previously referred to and which in reality comprises a portion of the hollow shaft 20, being detachably bolted thereto in order that it may be readily removed. The previously described upper cam 28 lies just below the tank bottom.

The circular series of measuring cylinders or chambers 10 previously referred to are suspended from the tank bottom 73 and the measuring mechanism will now be described. In Figure 8 the details of construction of one of the measuring cylinders, together with the mechanism associated with it and by means of which it is enabled to accomplish its measuring functions, can most clearly be perceived. The measuring chamber is preferably formed in three portions, the cylindrical body 75, a frusto-conical top 76 leading upwardly to a relatively restricted tubular duct 77 and the frusto-conical bottom 78 leading downwardly to a downwardly projecting tubular extension 79. In the side wall of the cylindrical portion 75 of the chamber is formed a cylindrical port 80 which comprises a liquid inlet port, this port being a prolongation of the horizontal portion of a liquid inlet conduit which comprises, in addition to the horizontal portion of the conduit shown, the vertical portion indicated at 81 extending upwardly from this horizontal portion to a port formed in the bottom of the liquid tank. A plunger valve 82 is slidably supported in the horizontal portion of the liquid inlet duct just described, this member closely fitting within the duct and comprising a valve and measuring element. It is movable from the position in which it is shown in full lines in that figure to the positions in which it is illustrated in dotted lines. When it is in its first-mentioned position liquid may freely flow from the tank into the measuring cylinder and will naturally rise in that cylinder until the level of its upper surface, within the restricted duct 77, is at the same level as the upper surface of the body of liquid in the tank, whereupon inflow will cease.

As will readily be perceived, the forward end of the plunger member 82 will cut off communication between the supply tank and the measuring chamber when the forward end of this member reaches the position indicated in dotted lines at 83. If there is further movement of the plunger element 82 toward the left (Figure 8), the effective volume of the measuring chamber will be decreased and if this movement is continued until the forward end of the plunger reaches the position indicated by the dotted lines 83', a substantial volume of the liquid previously introduced into the cylinder and inlet duct will be displaced. This will cause the liquid to rise in the restricted duct 77 and a portion of it to overflow and return to the storage tank, a baffle 84 being provided to prevent the liquid thus discharged from striking the top of the tank.

The upper edge of the tubular duct 77 is bevelled, as shown, to provide a clean cut-off for the outflowing liquid and the means for reciprocating the plunger and valve member 82 is made so as to be readily adjustable in order that this plunger may be advanced into the cylinder to the desired extent, making it possible to very precisely regulate the cubic capacity of the measuring cylinder to initially compensate for any slight irregularity in the manufacture of the several parts of the measuring mechanism and to permit subsequent adjustment of the volume whenever necessary.

The plunger element 82 has, at its inner end, a notched extension 85 within which is received the rounded lower end of one lever arm 86 of what in reality is a bell crank lever, having a second arm 87 provided with an anti-friction roller 88 which at all times lies within a cam track 89 formed in the cylindrical surface of stationary cam 28. As the shaft 20, together with the cylindrical member 34 and the measuring mechanism revolves about the cam 28, the bell crank lever will rock about a horizontal axis parallel to a tangent to the surface of cam 28. From an inspection of Figures 9 and 10 the details of construction of this lever, including the details of the means for relatively adjusting the two arms 86 and 87 of the lever, may be more fully perceived. A supporting bracket which is rigidly attached to the extension 34 of column 20 is indicated at 92 and rotatably supported in coaxially disposed cylindrical apertures in the vertical webs of this bracket is a pin 93. The outer end of lever arm 87 is keyed to this pin and lies intermediate the vertical webs of the supporting bracket. The upper end of the lower lever arm of the bell crank is bifurcated and the spaced parallel arms thereof pass upwardly upon opposite sides of the bracket and are provided with aligned cylindrical recesses to receive the ends of pin 93, arm 86 being thus rockably mounted upon the pin. Upon one end of the pin 93 is keyed a flat lever member 94 the inner face of which lies flush against the adjacent outer face of the upper end of the lever 86 and the lower end of which is connected to lever 86 in such manner that the angular relationship of levers 86 and 87 may be adjusted to a limited extent. This mechanism includes the screw bolt 95 which passes through aligned apertures 86' formed in the lever 86, the walls of which apertures are not threaded, and also through a threaded aperture formed in block 97 mounted upon the inner end of a stud 98 rotatably supported in an aperture formed in the free end of arm 94. Block 97 is positioned within a recess 99 formed in the lever 86. It will readily be perceived that, by rotating the screw bolt 95, the angular relationship of levers 86 and 87 can be varied within limits, thus varying the distance which the plunger member 82 will be moved toward and into the measuring chamber 75 upon the working stroke of the plunger, thus in turn varying as desired the cubic capacity of the measuring cylinder. The screw bolt 95 is retained against rotation by a lock nut 100 and relative rotation of the lock nut and screw bolt is prevented by means of a wire 101 passing through registering apertures in the lock nut and screw bolt, the ends of the wires being officially sealed as by a lead seal 102 to prevent undetected tampering with the mechanism.

As shown in Figure 11, the enlarged head 95' of the screw bolt 95 may be provided with radial markings such as indicated at 95², to aid in making such adjustments and to enable the operator to accurately make very fine angular adjustments of the relationships between the levers 86 and 87.

The valve mechanism for controlling the outflow of liquid from each of the measuring chambers, after such chamber has been accurately filled with the desired amount of liquid, may be most clearly perceived in Figures 8, 12 and 13. As previously stated, the bottom 78 of the measuring chamber terminates in a downwardly directing tubular discharge duct 79. Slidably fitting within tube 79 is a tubular member 110 which may be designated a valve lifting sleeve, the upper end of this sleeve terminating below the upper end of duct 79 but having mounted thereon or operatively connected to its upper end the liquid outflow cut-off valve 111, this valve having a frusto-conical seating surface adapted to rest upon the frusto-conical upper surface of measuring chamber bottom member 78 encircling the mouth of duct 79. The valve lifting sleeve member 110 in reality is suspended from valve 111 when the valve is in closed position, as shown in Figure 12, but will serve to elevate this valve to the position in which it is shown in Figure 13 when raised as by means of a force applied vertically upwardly from below.

Slidably mounted upon the exterior surface of the tubular valve lifting member 110, and below the lower end of discharge duct 79, is a container engaging sleeve 112, this sleeve being formed in cross-section as indicated in Figures 12 and 13, with a restricted neck immediately below the end of valve lifter 110 providing an annular shoulder 113 which is adapted to engage the lower end surface of valve lifter 110 when member 112 is moved upwardly and to disengage the lower end of member 110 when allowed to fall, as indicated in Figure 12. Container engaging member 112 is only held in position by means of the conical valve 114, the elongated stem 115 of which extends upwardly through the valve lifting member 110 and is hooked over and rests upon the upper edge of that member, the laterally extending portion 115' of the valve stem being provided with a notch to receive the relatively sharp upper edge of member 110, as indicated in Figures 12 and 13 so that the stem and valve may not become accidentally dislodged from the position in which it is shown. A spring member 117 has its lower end received within a recess in valve 114 and its upper end encircling the valve stem 115. Normally the upper end of the spring, at 117', exerts a light pressure against the inner surface of valve lifting tube 110 so that, when the container engaging member 112 is lifted, and the valve 114 is free to swing laterally about the point of suspension at the upper end of its stem, it will assume the position in which it is shown in Figure 13, being disposed eccentrically of the liquid discharge port formed in the lower end of member 112, thus causing the liquid to discharge into a container, such as indicated at C² in a stream of semi-circular or "horseshoe" cross-section, this stream impinging against the side walls of the container and descending to the bottom with minimum turbulence, thus, in the case of milk, minimizing foaming. The lower end of the container engaging member 112 is especially shaped to engage the upper edge of the container which the machine is designed and intended to fill. As shown in Figure 21, the container which the machine illustrated has been particularly designed to receive and charge has an open end of irregular shape, the foldable upper end of this container having been partially folded, with two opposed side panels rocked inwardly toward each other about their lower edges and the other two opposed side panels being partially collapsed, preparatory to being underfolded in the final closing operation just before sealing. It will be appreciated, of course, that the enlarged lower end of the container engaging member 112 may be differently fashioned where containers having open upper ends of different configurations are passed through the machine. Member 112 is likewise provided with a drip guard 120 to collect condensate which may form on the measuring cylinder and run downwardly, this guard being sufficiently large to extend beyond the open mouth of a container, thereby preventing contamination of the container, and being provided with a pouring lip 121 over which collected condensate may be passed and be discharged laterally of the path of movement of the containers.

In order that the container engaging element 112 may not revolve around the axis of the valve lifting sleeve 110, it is provided with a pin 122 slidably received within a recess 123 formed in the stationary duct 79, the container engaging element being thus maintained in position to properly engage the mouth of a container presented to it, at all times.

It is thought that the operation of the valve structure just described will be apparent from what has already been said but it may be remarked that valve 111 is a flow control valve and valve 114 a drip valve and flow deflector, preventing drops of liquid which collect and run down the inner walls of the valve lifting member 110 between liquid discharging operations from escaping in the form of drops during the time that a filled container is being removed from below the container engaging element 112 and is being replaced by an empty container. This is an important feature of a machine which may be employed in the packaging of milk, as will be appreciated by one skilled in that art. Likewise, the flow control mechanism just described may be readily disassembled for the purpose of sterilization, the bottoms of the cylinders being removable and the valves easily separable from such bottoms, the stem of valve 114 being first unhooked from the upper edge of member 110 and removed, following which member 112 can be readily removed from the projecting end of member 110 and, after removal of the snap ring 125, the valve lifting member 110 and valve 111 can be easily disassembled from the cylinder bottom and duct 79.

The mechanism for lifting and lowering the various platforms upon which containers are placed for filling has been previously described and this mechanism is in continuous operation during the operation of the machine, the tank, cylinders and container supporting platforms being revolved about the axis of the machine at a uniform angular velocity. It is thus essential to provide means for supplying empty containers at a uniform rate and for removing filled containers at the same rate. The mechanism for supplying containers is shown in plan in Figure 1 and further in Figures 3, 4 and 5. In Figure 1 a conveyor for advancing empty containers along a rectilinear path of movement is indicated generally at A and a transfer device for receiving containers delivered by the conveyor A and moving them successively onto container receiving platforms 111, is indicated at B. The details of construction of the conveyor A may be varied as desired and it need only be said here that by means of this conveyor, including the container engaging and advancing slide 130, each successive container is moved to the position in which it is indicated in chain lines at $C^3$ in Figure 5. Immediately thereafter one face of the flat walled container is engaged by the outer end of an arm 141 and the container is rather rapidly moved around a trackway which includes the two parallel supporting rails 142 and the outer guard member 143 until it successively occupies the position $C^4$ and $C^5$, in which last mentioned position it is shown to be resting upon a container supporting and elevating platform 11. There are two arms 141 diametrically opposed to each other and which alternately function in the transfer of containers to the filling device proper, each such arm having its inner end pivoted at 141' to the end of one arm of the two-armed spider or revoluble support 144, this revoluble support including the cylindrical sleeve 145 which is adapted to be revolved at a uniform rate during the operation of the mechanism.

Each arm 141 is likewise provided with a cam follower 146, projecting upwardly therefrom, both of these cam followers projecting into cam track 148 formed in the undersurface of the stationary cam 149. As the spider 144 is revolved, it of course draws the arms 141 with it and these arms are caused, by the cooperation of the cam followers with the stationary cam, to remain in substantially radial positions, as they are shown in full lines in Figure 5, through the greater part of their travel but, as each serves to place a container upon a platform 11, to thereafter fall back to the position indicated in chain lines in Figure 5 so as not to thrust the container forcibly against the leading container side guard 50, which has been moved to container retaining position just prior to reaching the position in which it is shown in full lines in Figure 5. As arm 141 continues its movement, it will be restored to substantially radial position just prior to the time when its outer end reaches a further empty container in position $C^3$. The operation of the transfer mechanism B thus described is of course synchronized with the rotation of the container supporting platforms 11 and other rotatable elements of the filling mechanism so that each successive platform 11 is supplied with a container as it passes the transfer mechanism. Likewise, after each successive container has been fully positioned upon a platform 11, the following container side guard 50 is brought into container confining position, the container side guard operating mechanism being likewise designed so that its operations synchronize with those of the filling and transfer mechanisms.

From the position $C^5$ of Figures 3 and 5 each container successively occupies the positions $C^6$, $C^7$, $C^8$, $C^9$, $C^{10}$, and $C^{11}$ and, at position $C^{11}$ the filling operation has been completed and the leading container side guard 50 rocked to inoperative position to facilitate removal of the container from the platform upon which it rests.

The details of the transfer device D for successively removing containers which have been filled, from the filling mechanism, and placing them on a further conveyor which is generally indicated at E, may be most clearly perceived from an inspection of Figures 1, 6 and 7. This transfer device includes four container engaging arms 132 each pivotally mounted at 133 upon the outer end of one arm of a spider 134 fixed upon the upper end of a power driven shaft 134'. Each such pivoted arm 132 is provided with a cam follower 135 which is received within a cam track 136 of a stationary or fixed cam 137. Cam track 136 is so shaped that the forward face of each arm 132 is moved into flush engagement with the rearmost flat side panel of a container just after the container has been released at least by the leading container side confining guard 50 and the container then moved off of the platform upon which it has rested during filling and onto platform 138 leading to the conveyor E. The container at position $C^{12}$ in Figure 7 is passing off of a platform 11 onto platform 138, that in position $C^{13}$ is being introduced into the conveyor E, between the side chains 140 thereof, and a container in position $C^{14}$ is fully engaged by conveyor E and is being advanced thereby in the direction of the arrow F. It will be appreciated that the cam track 136 is so shaped as to cause the container engaging arms 132 to rock forwardly and rearwardly in the accomplishment of the function specified and without interfering with any of the operating or stationary parts of the mechanism. Associated with this transfer device D is a curved guard 150 which prevents accidental overturning of the containers.

The operation of the transfer device D is likewise synchronized with the movements of the filling mechanism per se and of the delivery conveyor and the several cams which control the movements of the majority of the operating members of the machine are so designed that the movements of the valves, cams, side guards, platforms, etc., are perfectly synchronized. The sequence of operation of the several valves may be more clearly perceived from an inspection of Figure 20.

Having thus described the invention, what is claimed as new and desired to be secured by Letters Patent is:

1. Container charging mechanism including vertically disposed coaxial inner and outer shafts, the inner shaft being stationary and the outer shaft being supported for revolution about the common axis of said shafts, a liquid supply tank, a liquid measuring device, and a liquid discharge control valve carried by the outer shaft, and actuating means for said device carried in part by the outer shaft and in part by the inner shaft, said means functioning whenever the outer shaft revolves and independently of the liquid discharge control valve.

2. Container charging mechanism including vertically disposed coaxial inner and outer shafts, the inner shaft being stationary and the outer shaft being supported for revolution about the common axis of said shafts, a liquid supply tank, a circular series of liquid measuring devices and a series of liquid discharge control valves carried by the outer shaft, and an individual actuating means for each such device carried in part by the inner shaft and in part by the outer shaft, said means functioning independently of the liquid discharge control valves when the outer shaft rotates.

3. Container charging mechanism including vertically disposed coaxial inner and outer shafts, the inner shaft being stationary and the outer shaft being supported for revolution about the common axis of said shafts, a liquid supply tank and a liquid measuring device carried by the outer shaft, actuating means for said device carried in part by the outer shaft and in part by the inner shaft, said actuating means comprising a lever carried by the outer shaft and a cam carried by the inner shaft, one end of said lever being in engagement with said cam, and a liquid discharge control valve also carried by said outer shaft and operable independently of said measuring device.

4. Container charging mechanism including vertically disposed coaxial inner and outer shafts, the inner shaft being stationary and the outer shaft being supported for revolution about the common axis of said shafts, a liquid supply tank supported upon the outer shaft, a series of measuring chambers carried by said tank and arranged circularly around the common axis of said shafts, a valve associated with each such chamber for controlling the flow of liquid from the tank into such chamber, a cam fixed upon the inner stationary shaft, and a series of levers rockably mounted on said outer shaft, each lever having one end operatively connected to one of said valves and its other end in contact with said cam, whereby the valves will be operated by the levers as the outer shaft is revolved about the inner.

5. The combination set forth in claim 4 in which each such lever includes two relatively adjustable arms and means for securing them in a desired relationship, for the purpose set forth.

6. Container charging mechanism including a frame, a cam fixed upon said frame, concentric vertically disposed shafts supported upon said frame the inner shaft being fixed and the hollow shaft mounted for rotation, a second cam, said second cam being rigidly mounted upon the inner fixed shaft, means supported upon said rotatable shaft and operatively connected to said first cam, for lifting a container to a predetermined position and thereafter lowering the same, and second means also carried by said rotatable shaft and operatively connected to said second cam, for measuring out predetermined volumes of liquid ready for delivery into a container in elemated position.

7. In a container charging machine, in combination, a circular series of container supports, a stationary cam, means for moving said container supports about an axis passing through the cam, means connecting each support with the cam whereby the support may be moved vertically as it is revolved about said axis, and a mechanism associated with each support for laterally confining and subsequently releasing a container mounted on said support, such mechanism being likewise operatively connected to said cam and being alternately rendered operative and inoperative thereby as the supports are revolved about said cam.

8. In a container charging machine, in combination, a circular series of container supports, a stationary cam, means for moving said container supports about an axis passing through the cam, means connecting each support with the cam whereby the support may be moved vertically as it is revolved about said axis, and mechanism for laterally confining containers mounted on said supports, said mechanism including a container side guard for each container support and mounted on said first mentioned means for movement into and out of container confining position, and a connection between each side guard and said cam, whereby the side guards are operated as they are revolved about said cam.

9. The combination set forth in claim 8 in which each container side guard comprises a gate-like member mounted for pivotal movement about an axis parallel to the axis about which said container support moving means revolves.

10. The combination set forth in claim 8 in which said mechanism includes two spaced container side guards for each container support, each guard being mounted on said first mentioned means for movement into and out of container confining position, and a connection between each side guard and said stationary cam whereby the side guards of each pair are successively rendered operative and inoperative as they revolve about said axis.

11. A machine for charging containers comprising a plurality of container supports, means for moving said supports in a circular path, means for moving empty containers successively onto supports successively passing a predetermined position along a path tangential to said first mentioned path, other means for removing charged containers from said supports along a path tangential to said first mentioned path, and guards for laterally confining containers mounted on said supports, each of said guards being movable from operative to inoperative position relatively to the associated support and vice versa, to facilitate loading of containers onto said supports and removal of containers therefrom.

12. A machine for charging containers comprising a liquid supply tank, a measuring cylinder below the tank, the upper end of the cylinder being in open communication with the tank at a point above the level of the liquid therein and the lower end of the cylinder having a valve controlled discharge port, a duct opening into the lower end of the cylinder and into the tank, whereby liquid from the tank may pass to the cylinder, and means for sealing said duct and moving, after the sealing of the duct, toward the cylinder to reduce its effective volume to a predetermined amount and effect the discharge of excess liquid back into the tank.

13. A liquid measuring device including a tank provided with means to maintain therein a body of liquid the upper surface of which cannot rise beyond a predetermined level, a measuring cylinder having an upwardly extending duct with a discharge port above said predetermined level at all times, a valve controlled discharge port in its bottom and a duct for leading liquid from the tank to the measuring cylinder, and a plunger movable in said last mentioned duct for first sealing the same after the measuring cylinder has been filled to said liquid level, and thereafter to continue to move to force liquid from said upper discharge port back into the tank until the cylinder contains an exact predetermined amount.

14. The combination set forth in claim 13 in which means is provided for advancing and retracting said plunger, which means is adjustable for the purpose of varying the volume of liquid measured.

15. A machine for charging containers comprising a liquid storage tank, a conduit leading downwardly into said tank, the open lower end of said conduit having a downwardly facing valve seating surface, a float encircling said conduit, and a valve detachably supported on said float in position to engage said valve seat, the valve support being a bar disposed diametrically of the valve seat and the ends of which are detachably connected to the underside of the float.

16. A machine for charging containers comprising a measuring cylinder having a tubular discharge duct at its lower end, a vertically movable valve for controlling liquid flow from the cylinder into the duct, a valve lifting member movable vertically of the duct, said member projecting below the lower end of the duct, a container engaging element slidably mounted on the lower end of said member and having a liquid duct passing vertically therethrough and provided with a downwardly facing valve seat, a second valve, said second valve being hung from said member and the valve seat of said element normally resting on said valve to close said duct, the arrangement being such that initial upward movement of said element unseats said second valve and further movement causes the said member to unseat the first valve, for the purpose set forth.

17. The combination set forth in claim 16 in which said second valve is provided with means for laterally deflecting the same with respect to its seat when said element is lifted, to laterally deflect a stream of liquid issuing from said cylinder.

18. A liquid measuring device including a measuring chamber having openings in its upper end and bottom, respectively, for the escape of liquid, a duct for leading liquid from a source of supply to said cylinder, a plunger movable in said duct to first block communication between the measuring chamber and the supply source and to thereafter force liquid from said upper port until the chamber contains only the exact amount desired, and a valve for closing the liquid escape port in the cylinder bottom during the filling and measuring operations and thereafter opening said port to permit escape of the measured volume of liquid.

19. A machine for charging containers of rectangular cross section having flat side walls comprising a circular series of container supports mounted for rotation about an axis, a movable guard associated with each container support and having a radially disposed container guiding surface, means for placing containers upon said supports as they successively pass a predetermined position, said means moving each container into position with one of its flat side walls disposed parallel to said radial container guiding surface, and means for successively moving said guards to inoperative positions as the associated container supports pass a further predetermined position, to facilitate removal of the containers from such supports along a path substantially tangential to the path of movement of said container supports.

ROBERT SPURR.